(12) United States Patent
Prescott

(10) Patent No.: US 6,660,853 B2
(45) Date of Patent: Dec. 9, 2003

(54) METHOD FOR PURIFYING HIGH MOLECULAR WEIGHT HYALURONIC ACID

(76) Inventor: Al Prescott, 62 Valliria Dr., Groton, MA (US) 01450

( * ) Notice: Subject to any disclaimer, the term of this patent is extended or adjusted under 35 U.S.C. 154(b) by 67 days.

(21) Appl. No.: 10/023,076

(22) Filed: Dec. 13, 2001

(65) Prior Publication Data

US 2002/0120132 A1 Aug. 29, 2002

Related U.S. Application Data

(60) Provisional application No. 60/255,808, filed on Dec. 15, 2000.

(51) Int. Cl.$^7$ .............................................. C08B 37/00
(52) U.S. Cl. ............................ 536/55.1; 536/54; 536/4; 536/123.1
(58) Field of Search ........................ 536/123.1, 4, 55.1, 536/54

(56) References Cited

U.S. PATENT DOCUMENTS

| 4,141,973 A | * | 2/1979 | Balazs | ......................... | 514/54 |
| 5,411,874 A | * | 5/1995 | Ellwood et al. | ............... | 435/84 |
| 5,631,241 A | * | 5/1997 | della Valle et al. | ........... | 514/54 |

OTHER PUBLICATIONS

The Merck Index, 1976, 9$^{th}$ edition, p. 31.*
Swann, D. A. "The Preparation and Properties of Rooster Comb Hyaluronic Acid", Biochim. Biophys. Acta, 1968, 156, 17–30.*

Bo–jiang, S. et al "The Preparation of Hyaluronic Acid From Rooster Combs And Its Physicochemical Properties", Pharmaceutical Industry, 1986, 17(7), 291–294. English translation.*

David A. Swann, Studies on Hyaluronic Acid: The Preparation of and Properties of Rooster Comb Hyaluronic Acid, Biochim, Biophys. Acta, 156, pp 17–30, 1968.

* cited by examiner

*Primary Examiner*—James O. Wilson
*Assistant Examiner*—Ganapathy Krishnan
(74) *Attorney, Agent, or Firm*—Brian M. Dingman, Esq.; Mirick, O'Connell, DeMallie & Lougee, LLP

(57) ABSTRACT

A method for purifying high molecular weight hyaluronic acid, comprising the steps of providing one or more raw hyaluronic acid sources; extracting hyaluronic acid from the source; precipitating hyaluronic acid extracts; dissolving extract precipitates in water; extracting enzyme inhibitors from the dissolved precipitates with chloroform, and centrifuging to isolate an aqueous portion; adding one or more protein hydrolyzing enzymes to the aqueous portion in a reactor; adding a solution of CPC and NaCl to the reactor; filtering reactor contents through at least one membrane filter; filtering membrane filtered solution through at least one diafilter having a molecular weight cutoff of about 30 kDa; precipitating the diafiltered solution and isolating purified hyaluronic acid precipitate; and formulating isolated precipitate to about 10 mg/ml hyaluronic acid.

7 Claims, 1 Drawing Sheet

METHOD FOR PURIFYING HIGH MOLECULAR WEIGHT HYALURONIC ACID

Figure 1:
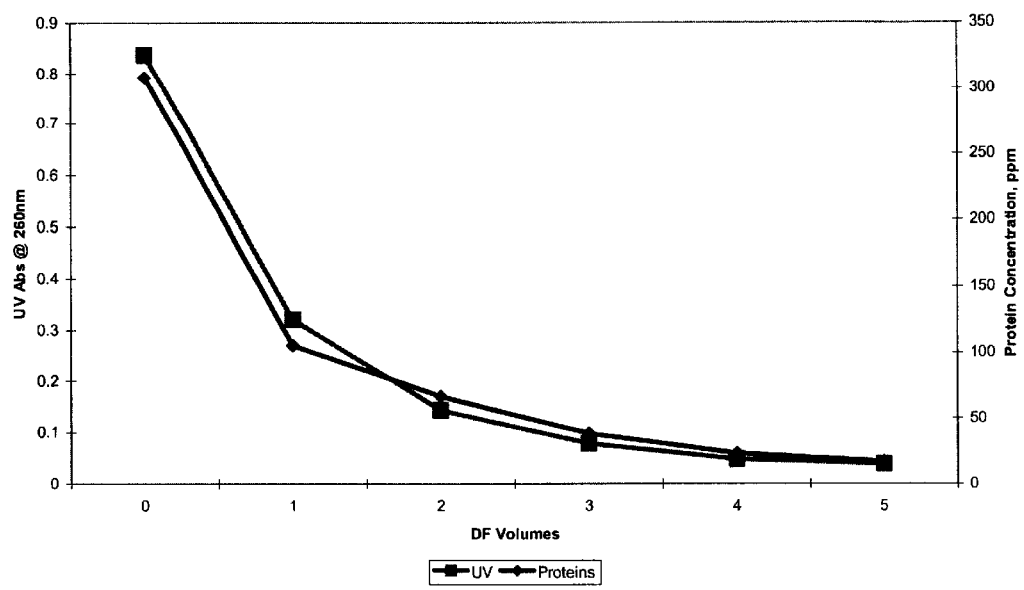

This application claims the benefit of Provisional application Ser. No. 60/255,808, filed Dec. 15, 2000.

FIELD OF THE INVENTION

This invention relates to a method of purifying hyaluronic acid.

BACKGROUND OF THE INVENTION

Hyaluronic acid (HA) is a biological polymer. It has only two components, D-glucuronic acid and 2-acetamido-2-deoxy-D-glucose, which repeat from 250 to 25,000 times. HA does not maintain a rigid tertiary structure, but instead, typically has a random coil configuration, familiar to most polymer scientists and engineers. The coil may be held semi-rigidly in its configuration by hydrogen bonds, but these are weak and can easily be disrupted. The polymer typically exists at physiological pH, at which the carboxyl groups are dissociated, conferring a polyanionic character to the molecule. In other words, for every disaccharide unit, there is a strong negative charge.

Hyaluronic acid is a critical component of connective tissue and typically exists in a state of strong association with proteins and other glycosoamino glycans (GAGs) such as Heparin and Chondroitin Sulfate. The chemical and physical structure of hyaluronic acid is very well known though the methods by which it interacts with the body are generally less understood.

Despite the fact that the chemical identity of the molecule never changes, (i.e., it always contains the same linear repeating disaccharide units), the number of repeating units can vary greatly by source. The table shows the molecular weight of hyaluronic acid isolated from various sources.

| Source | Molecular Weight, daltons |
| --- | --- |
| Human umbilical cord | $3.4 \times 10^6$ |
| Bovine vitreous humor | $7.7 \times 10^4 - 1.7 \times 10^6$ |
| Bovine synovial fluid | $14 \times 10^6$ |
| Human synovial fluid (Normal) | $6 \times 10^6$ |
| Human synovial fluid (Rheumatoid) | $2.7 - 2.5 \times 10^6$ |
| Rooster Comb | $1.2 \times 10^6$ |
| Streptococcal cultures | $0.93 \times 10^6$ |

Hyaluronic acid has very unique properties when it is in its solution form. In particular, at very low concentrations in water ($\leq 1\%$) viscosities can exceed 50,000 cps, and the solution has significant non-Newtonian behavior in its elasticity, shear thinning, and cohesiveness. Hyaluronic acid, because it can hold large amounts of water (over 5 times what glycerin holds), has moisturizing and lubricating properties. It is also, when purified properly, biologically inert, which makes it extremely useful for various medical applications.

The major issue with HA production is a lack of technology that removes the lower molecular weight impurities that is fast, economical, and non-destructive to the HA molecule. Below is a description of two methods currently used to make medical grade HA.

In Balazs, U.S. Pat. No. 4,141,973, the HA production process is as follows: slice rooster combs into small pieces, and wash with ethanol (4L ethanol to 1 kg comb). Discard ethanol and repeat until ethanol is not cloudy. Add combs to water and chloroform in the following amounts: 2.5 kg combs: 10 liters water: 0.5 liters chloroform. Mix and allow to combs to swell. The combs are then filtered from the broth. NaCl is added to the broth and additional chloroform extractions are performed. Pronase® digestion is accomplished, and the Pronase® is then removed via chloroform extraction and centrifugation. The product is then filtered through sterilizing filters, followed by precipitation in ethanol. The HA is then formulated into medical products.

In Swann, *Studies on Hyaluronic Acid: The Preparation of and Properties of Rooster Comb Hyaluronic Acid*, Biochim, Biophys. Acta, 156, pp 17–30, 1968, the process described is as follows: slice rooster combs into small pieces, and wash with acetone. Discard acetone and repeat until acetone is not cloudy. Add combs to water with a preservative to prevent microbial growth (EDTA). Combs are then filtered from broth, NaCl is added, and the broth is centrifuged and precipitated in 3 volumes of ethanol. The precipitate is dissolved in a Tris buffer, pH=8.0, and Pronase® digestion performed, NaCl added, and then precipitated in 3 volumes ethanol. Precipitate was then dissolved in water and extracted against chloroform. The aqueous phase was added to a 1% CPC solution and the resulting precipitate allowed to settle overnight. Precipitate was added to 0.3 M NaCl. The solution was centrifuged and precipitated in three volumes of ethanol. It is assumed that at this point, the hyaluronic acid would be dissolved in water and sterilized using filters and precipitated in ethanol (same as Balazs). The product would then be formulated into medical products.

These methods are used to produce the materials shown in the next table, as reported by Uden and Lavoie, *Laboratory Evaluation of Commercial Hyaluronate Sodium Products*, Journal of Equine Veterinary Science, Vol. 17(3), pp. 123–125, 1997.

| Sample ID | NaHA Conc., Mg/ml | Proteins, Ppm | UV, abs @ 260 nm | IV, Ml/g | UV/HA, Abs * ml/mg | Protein/HA, Ppm * ml/mg |
| --- | --- | --- | --- | --- | --- | --- |
| Hylartin ™ (Balazs Process) | 8.9 | 9.76 | 0.8 | 3,978 | 0.090 | 1.097 |
| Hyvisc ™ (Swann Process) | 9.2 | 4.47 | 0.2 | 3,466 | 0.022 | 0.486 |

In the table, IV (intrinsic viscosity) is a measure of molecular weight. 750,000 daltons of MW is about equal to an IV of 1750 ml/g.

Balazs' process lacks a CPC step, which helps remove DNA as evidenced by Swann's lower UV numbers. It also appears than Swann's material has a lower protein level.

In addition, both methods take a very long time, a lot of ethanol (a flammable and expensive liquid) and multiple precipitation steps, each requiring the manual handling of the product, to purify a small amount of HA. For example, Swann's method as practiced in the lab has the following time and ethanol quantity parameters:

| Step | Time, days | Ethanol Used, Liters |
| --- | --- | --- |
| Comb Slice Ethanol Wash | 3 | 6 |
| Water Extraction | 3 | 0 |
| Comb Removal/NaCl/Centrifuge/Precipitate | 1 | 3 |
| Dissolve/Chloroform Extraction/Centrifuge/Precipitate | 6 | 3 |
| Dissolve/Pronase | 2 | |
| CPC/Washes/Re-dissolve/Centrifuge/Precipitate | 3 | 3 |
| Dissolve/Chloroform Extraction/Centrifuge/Precipitate | 3 | 3 |
| Formulate | 1 | 0 |
| Total | 22 | 18 |

SUMMARY OF THE INVENTION

The inventive process yields hyaluronic acid from rooster combs having qualities that are equal to, or in some cases superior to, hyaluronic acid derived by the industry standard procedures. This is supported by the following facts. First, the molecular weight of the HA made in accordance with the invention as measured by intrinsic viscosity is similar to that of hyaluronic acid derived by the standard method. Second, the inventive HA solution is as free of protein as other commercially used hyaluronic acid. Third, the UV absorbance at 260 nm is superior to that of other commercial hyaluronic acid solutions with comparable intrinsic viscosities. Lastly, the process takes 55% of the time and only 67% of the solvent required to make hyaluronic acid solutions as compared to the standard process.

Molecular weight is the parameter that most affects the physical properties of hyaluronic acid-based medical devices. Molecular weight influences the viscosity vs. concentration profiles of hyaluronic acid solutions, and plays a major role in its other visco-elastic properties. In particular, solutions that require a given viscosity for therapeutic efficacy require lower concentrations of hyaluronic acid if the molecular weight is increased. This has been shown to provide advantages in both ocular and orthopedic applications. A process that is capable of generating medical grade hyaluronic acid having a molecular weight greater than 750,000 daltons thus has significant commercial potential.

When considering a chemical species for any medical application, one of the key parameters is purity. FDA will not approve products for use in the United States if a certain level of purity is not reached. In addition, the process must be robust enough to guarantee the product is consistently pure. In the HA of the invention, the two major measurements of purity, protein concentration and UV absorbance at 260 nm, either meet or exceed current industry standards for approved products in the U.S.

Finally, the inventive process takes less time to produce hyaluronic acid, and less raw materials. Less labor and material translates into a cost savings in production.

Overall, the advantages of the inventive process are that it:

1. Generates hyaluronic acid that is high in molecular weight so as to be efficacious in medical applications,
2. Meets or exceeds all standards for purity and is therefore a strong candidate for FDA approval, and it is
3. Cost effective and competitive.

These qualities clearly demonstrate a superior method of purifying medical grade hyaluronic acid from rooster comb. Those skilled in the art will also recognize the potential for this method to be used for high MW HA from any source, not just rooster combs.

Rooster comb was used in the examples of the invention because it is felt in the industry that rooster comb has more impurities than other HA sources. Thus, the process should be even more effective in purifying HA from other sources.

This invention features a method for purifying high molecular weight hyaluronic acid, comprising the steps of providing one or more raw hyaluronic acid sources; extracting the hyaluronic acid from the sources; precipitating the hyaluronic acid extracts; dissolving extract precipitates in water; extracting enzyme inhibitors from the dissolved precipitates with chloroform, and centrifuging to isolate an aqueous portion; adding one or more protein hydrolyzing enzymes to the aqueous portion in a reactor; adding a solution of CPC and NaCl to the reactor; filtering reactor contents through at least one membrane filter; filtering membrane filtered solution through at least one diafilter having a molecular weight cutoff of about 30 kDa; precipitating diafiltered solution and isolating purified hyaluronic acid precipitate; and formulating isolated precipitate to about 10 mg/ml.

The aqueous portion is preferably maintained in the reactor with the hydrolyzing enzymes at a pH of about 8.0 using a buffer. The aqueous portion may be maintained in the reactor with the hydrolyzing enzymes at a temperature of about 37° C. Also claimed is a composition comprising hyaluronic acid purified using the described methods.

The purified hyaluronic acid preferably has an average molecular weight greater than about 750,000 Daltons. The solution of CPC and NaCl preferably comprises about 2% CPC and about 0.3 M NaCl.

Also featured is a method for purifying high molecular weight hyaluronic acid, comprising the steps of disinfecting one or more raw hyaluronic acid sources; placing the disinfected source in water with an antiseptic to form a solution; mixing the solution until the solution forms an extract having a viscosity of at least about 500 cps; straining the extract from the solution and treating with NaCl; centrifuging the treated extract and adding ethanol to form a precipitate; dissolving the precipitate in water; extracting enzyme inhibitors from the dissolved precipitate with chloroform and centrifuging to produce an aqueous portion; adding one or more protein hydrolyzing enzymes to the aqueous portion in a reactor; adding a solution of CPC and NaCl to the reactor; filtering reactor contents through at least one membrane filter; filtering membrane filtered solution through at least one diafilter having a molecular weight cutoff of about 30 kDa; precipitating diafiltered solution and isolate purified hyaluronic acid precipitate; and formulating isolated precipitate to about 10 mg/ml.

DESCRIPTION OF THE DRAWING AND DETAILED DESCRIPTION OF THE PREFERRED EMBODIMENT

FIG. 1 is a graph showing the reduction in protein concentration and UV absorption during the diafiltration process described below.

The following is a description of the preferred embodiment of the inventive process, with the amount of time in days, and the amount of ethanol used, indicated where relevant:

1. Rooster combs are sliced and placed in ethanol. The ethanol is changed daily until it is no longer cloudy. Three days, 6 liters ethanol used.
2. The ethanol is drained and the combs are placed in water with an antiseptic (Thymol) to prevent microbial growth.

3. The combs are mixed at less than 10° C. overnight or until the solution viscosity exceeds 500 cps. Steps 2 and 3 together take 3 days and use no ethanol.
4. The combs are strained from the extract. The extract is treated with NaCl to a final concentration of 0.2 M.
5. The extract is centrifuged and added to 3 volumes of ethanol and the resulting stringy white precipitate is removed and stored under ethanol. Steps 4 and 5 together take 1 day and use 3 liters ethanol.
6. Dissolve precipitate in DI water to approximately 1.5 mg/ml concentration. Though the actual concentration will change later, 0.75 to 5.0 mg/ml HA may be successfully precipitated with ethanol (and NaCl).
7. Add 100 ml of chloroform to every 1 liter of solution, mix overnight and centrifuge for 5 minutes at 4,000 RPMs. This step removes residual fats, lipids, certain proteins and other materials that have been found to inhibit the Pronase® step. Steps 6 and 7 together take 2 days and use no ethanol.
8. Add the aqueous portion to a temperature-controlled reactor, add an antiseptic (Thymol),<0.5 mM $CaCl_2$, heat to 37° C., adjust pH to 8.0 and add Pronase®. These are optimum Pronase® conditions per CalBiochem, Pronase® manufacturers.
9. Maintain pH at 8.0 via pH control and the addition of 0.2 M Tris buffer. Run until no more Tris is required (typically overnight). This hydrolyzes proteins not removed by chloroform, as well as the link proteins responsible for binding HA to other GAG's. Steps 8 and 9 together take 1 day and use no ethanol.
10. Make up a solution of 100 mls of 2% CPC and 0.3 M NaCl. Adjust the reactor contents to 0.3 M, and add the CPC/NaCl solution to the reactor. It will change color from opaque to yellow. Allow it to mix for 15 minutes. Filter the reactor contents through a membrane filter (0.2 micron PES filter) and collect in a flask. This causes DNA, chondriotin sulfate, heparin and other non-HA GAG's to complex and precipitate. They are subsequently removed by filtration. This step takes one-half day, and no ethanol.
11. Using a Pall-Filtron 30 kDa MWCO PES membrane, diafilter the solution against 5 volumes of 0.3 M NaCl. This removes amino acids, peptides, Pronase®, CPC and other low MW contaminants.
12. Either precipitate with ethanol and dry under vacuum, or lyophilize the contents of the flask. This is the best way to store material until formulation. Formulation strength cannot be achieved through TFD at this time. Steps 11 and 12 together take one-half day and use 3 liters ethanol.
13. Formulate to 10 mg/ml and verify properties against the traditional process. 10 mg/ml is a simple HA concentration that has been used often in the industry. One day, no ethanol.

The following describes the equipment used for diafiltration:

| DF Parameter | Value |
|---|---|
| 1. Three membrane setup (Used to determine MW cutoff for diafiltration) | |
| Membrane Type | Omega Polyethersulfon |
| Channel Depth | 40 mil |
| Membrane Area | 0.045 ft²/channel |
| Number of Channels | 3 in parallel |
| Trans-Membrane Pressure (TMP) | 18.5 psig |
| Pressure drop across membrane | 2.5 psig |
| Cross Flow Rate | 200 ml/min/channel |
| 2. Single membrane DF experimental setup (Used to purify HA from rooster comb) | |
| Membrane Type | Omega Polyethersulfon |
| Membrane Area | 1.0 ft² |
| Trans-Membrane Pressure (TMP) | 8.0 psig |
| Cross Flow Rate | 1,000 ml/min |
| MWCO | 30 k |
| Type | Centramate |
| Configuration | Open Channel |

The pump used to performed the diafiltration was a Cole-Parmer Masterflex® L/S® Precision Standard Tubing Pump capable of over 1700 ml/min, SKU# EW-77911-00.

The below table shows results of rooster comb HA purification using the Swann process, and for repetitions of the inventive methodology:

| Sample ID | NaHA, mg/ml | Proteins, Ppm | UV, abs @ 260 nm | IV, Ml/g | UV/HA, Abs * ml/mg | Protein/HA, Ppm * ml/mg |
|---|---|---|---|---|---|---|
| Sample using Swann's method | 9.92 | 6 | 0.267 | 2,166 | 0.027 | 0.605 |
| Inventive method, experiment #1 | 9.11 | 10 | 0.183 | 2,095 | 0.0201 | 1.098 |
| Inventive method, experiment #2 | 9.08 | 9 | 0.093 | 2,248 | 0.0102 | 0.991 |
| Inventive method, experiment #1 | 9.28 | 12 | 0.103 | 2,224 | 0.0111 | 1.293 |
| Inventive method, experiment #4 | 9.65 | 11 | 0.101 | 2,167 | 0.0105 | 1.140 |

What is claimed is:

1. A method for purifying high molecular weight hyaluronic acid, comprising the steps of:
   providing one or more raw hyaluronic acid sources;
   extracting said hyaluronic acid from said sources;
   precipitating said hyaluronic acid extracts;
   dissolving extract precipitates in water;
   extracting enzyme inhibitors from said dissolved precipitates with chloroform, and centrifuging to isolate an aqueous portion;
   adding one or more protein hydrolyzing enzymes to said aqueous portion in a reactor;
   adding to the reactor a solution of about 2% cetyl pyridinium chloride (CPC) and about 0.3M NaCl to precipitate non-hyaluronic acid glycosoamino glycans;
   filtering reactor contents through at least one membrane filter to remove precipitants;
   filtering membrane filtered solution through at least one diafilter having a molecular weight cutoff of about 30 kDa to remove low molecular weight contaminants; and precipitating diafiltered solution and isolating purified hyaluronic acid precipitate.

2. The method of claim 1, wherein said aqueous portion is maintained in said reactor with said hydrolyzing enzymes at a pH of about 8.0 using a buffer.

3. The method of claim 2, wherein said aqueous portion is maintained in said reactor with said hydrolyzing enzymes at a temperature of about 37° C.

4. A method for purifying high molecular weight hyaluronic acid, comprising the steps of, disinfecting one or more raw hyaluronic acid sources;

placing the disinfected source in water with an antiseptic to form a solution;

mixing said solution until the solution forms an extract having a viscosity of at least about 500 cps;

straining said extract from said solution and treating with NaCl;

centrifuging said treated extract and adding ethanol to form a precipitate;

dissolving said precipitate in water;

extracting enzyme inhibitors from said dissolved precipitate with chloroform and centrifuging to produce an aqueous portion;

adding one or more protein hydrolyzing enzymes to said aqueous portion in a reactor;

adding to the reactor a solution of about 2% cetyl pyridinium chloride (CPC) and about 0.3M NaCl to precipitate non-hyaluronic acid glycosoamino glycans;

filtering reactor contents through at least one membrane filter to remove precipitants;

filtering membrane filtered solution through at least one diafilter having a molecular weight cutoff of about 30 kDa to remove low molecular weight contaminants; and precipitating diafiltered solution and isolate purified hyaluronic acid precipitate.

5. The method of claim 4, wherein disinfecting is accomplished with ethanol.

6. The method of claim 1 further comprising formulating the isolated purified hyaluronic acid precipitate to about 10 mg/ml.

7. The method of claim 4, further comprising formulating the isolated purified hyaluronic acid precipitate to about 10 mg/ml.

* * * * *